United States Patent [19]

Schmalstieg et al.

[11] Patent Number: 5,468,804
[45] Date of Patent: Nov. 21, 1995

[54] WATER-SOLUBLE OR WATER-DISPERSIBLE POLYISOCYANATE COMPOSITION, A PROCESS FOR ITS PREPARATION AND ITS USE IN COATING COMPOSITIONS

[75] Inventors: Lutz Schmalstieg, Köln; Wolfgang Kremer, Kerken; Martin Brahm, Engelskirchen; Joachim Probst; Werner Kubitza, both of Leverkusen, all of Germany

[73] Assignee: Bayer Aktiengesellschaft, Leverkusen, Germany

[21] Appl. No.: 306,335

[22] Filed: Sep. 15, 1994

[30] Foreign Application Priority Data

Sep. 23, 1993 [DE] Germany .................. 43 32 322.7

[51] Int. Cl.[6] ................ C08J 3/00; C08K 3/20; C08L 75/00; B32B 27/00
[52] U.S. Cl. ............... 524/591; 524/839; 428/423.1
[58] Field of Search ................... 524/591, 839; 428/423.1

[56] References Cited

U.S. PATENT DOCUMENTS

| | | | |
|---|---|---|---|
| 4,663,377 | 5/1987 | Hombach et al. | 524/196 |
| 5,075,370 | 12/1991 | Kubitza et al. | 524/591 |
| 5,331,039 | 7/1994 | Blum et al. | 524/507 |
| 5,336,711 | 8/1994 | Schneider et al. | 524/507 |

FOREIGN PATENT DOCUMENTS 59-191770  10/1984  Japan .

Primary Examiner—Paul R. Michl
Assistant Examiner—Patrick Niland
Attorney, Agent, or Firm—Joseph C. Gil; Thomas W. Roy

[57] ABSTRACT

A water-dispersible polyisocyanate composition obtained by the partial urethanization of the isocyanate groups of 2,4- and/or 2,6-diisocyanatotoluene with monohydric and polyhydric alcohols, a process for its production, its use as the binder for an aqueous two-component coating composition in combination with a water-soluble or water-dispersible polyhydroxyl component and coatings for water-resistant sheet-form substrates prepared from this coating composition.

11 Claims, No Drawings

WATER-SOLUBLE OR WATER-DISPERSIBLE POLYISOCYANATE COMPOSITION, A PROCESS FOR ITS PREPARATION AND ITS USE IN COATING COMPOSITIONS

BACKGROUND OF THE INVENTION

1. Field of the Invention

This invention relates to nonionic-hydrophilically modified polyisocyanate compositions containing urethane groups based on 2,4-and/or 2,6-diisocyanatotoluene, to a process for their production, to two-component polyurethane coating compositions containing the polyisocyanate compositions and to their use for the production of coatings on water-resistant substrates.

2. Description of the Prior Art

In surface technology, ecologically safe lacquers and coating compositions are becoming increasingly more important. The important problem in this regard is to reduce the quantities of organic solvents used in lacquers and coating compositions. An important contribution towards solving this problem has been made by the recently developed water-based polymer dispersions and the recently developed water-based two-component polyurethane coating compositions. These latter compositions, in the same way as the corresponding solvent-based, two-component polyurethane coating compositions, enable high-quality lacquer coatings to be produced.

These two-component polyurethane coating compositions are described, for example, in EP-A-0,358,979, EP-A-0,543,228 and EP-A-0,542,105 and in the PCT applications with the publication numbers 9305087 and 9309157. Of particular importance in this regard are the systems according to EP-A-0,358,979 based on selected water-soluble or water-dispersible polyacrylate resins and preferably low molecular weight aliphatic lacquer polyisocyanates. The lacquers according to these prior publications dry relatively slowly so that they are of only limited use for applications where rapid drying is a critical requirement, for example, in wood and furniture coatings.

The same also applies to the two-component systems according to Japanese patent application 58-66736 published under number 191770/1984. According to applicants' own investigations, the coating compositions described in this prior publication show totally inadequate film-forming properties (matt films with serious surface defects are always obtained), in addition to which drying times of 3 days are necessary, even when aromatic polyisocyanates are used, as can be seen from the examples.

Accordingly, an object of the present invention is to provide new water-based two-component polyurethane coating compositions which would have an acceptable pot life, but harden at room temperature just as quickly as known solvent-based, two-component polyurethane coating compositions.

It has now surprisingly been found that this object may be achieved by using the polyisocyanate compositions according to the invention described in detail hereinafter as the polyisocyanate component in water-based two-component polyurethane coating compositions described hereinafter.

SUMMARY OF THE INVENTION

The present invention relates to a water-dispersible or water-soluble polyisocyanate composition obtained by the partial urethanization of the isocyanate groups of 2,4- and/or 2,6-diisocyanatotoluene by reaction with monohydric and polyhydric alcohols, wherein the polyisocyanate composition has, based on solids, a) an average NCO functionality of 1.9 to 3.3, b) a content of isocyanate groups (expressed as NCO, molecular weight 42) of 8 to 18% by weight, c) a content of ethylene oxide units (expressed as $C_2H_4O$, molecular weight 44) of 5 to 40% by weight which are arranged in terminal polyether chains containing an average of 7 to 25 alkylene oxide units in which at least 70 mol-% of the alkylene oxide units are ethylene oxide units, and d) a urethane group content (expressed as $CHNO_2$, molecular weight 59) of 13 to 33% by weight.

The present invention also relates to a process for the production of this polyisocyanate composition by reacting at an NCO:OH equivalent ratio of 4:1 to 120:1

A) a polyisocyanate component having an average NCO functionality of 2.7 to 4.1, a content of isocyanate groups of 12 to 20% by weight and a content of urethane groups of 17 to 29% by weight, and containing at least one urethane-modified polyisocyanate produced by partial urethanization of the isocyanate groups of 2,4-and/or 2,6-diisocyanatotoluene with B) a monofunctional hydrophilic polyether component containing at least one monohydric polyether alcohol containing an average of 7 to 25 alkylene oxide units in which at least 70 mol-% of the alkylene oxide units are ethylene oxide units, to form additional urethane groups.

Finally, the present invention also relates to a water-based two-component polyurethane coating composition in which the binder contains a mixture of I) the previously described polyisocyanate composition and II) a water-soluble or water-dispersible polyhydroxyl component, in quantities corresponding to an NCO:OH equivalent ratio of 0.6:1 to 2:1, and to its use for the production of coatings on water-resistant substrates.

DETAILED DESCRIPTION OF THE INVENTION

A number of prior publications, for example EP-A-0,061,628, EP-A-0,013,112, DE-OS 2,908,844, DE-OS 2,921,681 and U.S. Pat. No. 3,996,154, describe the production of water-dispersible polyisocyanates by reacting aromatic polyisocyanates with hydrophilic monohydric polyether alcohols containing ethylene oxide units; urethane-group containing polyisocyanates prepared from diisocyanatotoluene are often mentioned in a long list of suitable starting materials. However, in none of these prior publications is there a specific reference to the polyisocyanate compositions according to the invention let alone its suitability for the production of quick-drying two-component polyurethane lacquers.

The starting materials used for the production of the polyisocyanate compositions according to the invention include:

A1) 2,4- and/or 2,6-diisocyanatotoluene, i.e., in particular 2,4 diisocyanatotoluene or mixtures thereof with up to 35% by weight, based on the weight of the mixture, of 2,6-diisocyanatotoluene, A2) polyhydric alcohols having a molecular weight of 62 to 500, preferably 106 to 300 and B) monohydric hydrophilic polyether alcohols containing ethylene oxide units.

The polyhydric alcohols A2) are selected from ethylene glycol, propylene glycol, the isomeric butanediols, pentanediols, hexanediols and octanediols, glycerol, trimethylol ethane, trimethylol propane, pentaerythritol and mixtures of these polyhydric alcohols. However, component A2) preferably contains, at least in part, polyhydric alcohols containing ether groups with a molecular weight (which may be calculated from the hydroxyl group content and hydroxyl functionality) of less than 500, preferably less than 300. Examples include diethylene and polyethylene glycols and dipropylene or polypropylene glycols or the alkoxylation products of the more than difunctional alcohols set forth above with, e.g., ethylene oxide and/or propylene oxide, which may be used in any order in the alkoxylation reaction. Ether-containing polyhydric alcohols are preferably used in quantities such that, in addition to structural units a) to d), the resulting polyisocyanate compositions according to the invention contain up to 16% by weight, preferably 2 to 16% and more preferably 2 to 12% by weight, based on a), of ether oxygen atoms from the polyhydric ether alcohols.

Component A2) is preferably a mixture of the polyhydric alcohols mentioned by way of example. Component A2) has an (average) hydroxyl functionality of at least 2.5, preferably 2.5 to 3.

Component B) is selected from monohydric polyether alcohols containing 7 to 25, preferably 10 to 20 alkylene oxide units in which at least 70 mol-%, preferably at least 80 mol-% and more preferably 100 mol-% of the alkylene oxide units are ethylene oxide units. In addition to ethylene oxide units, other alkylene oxide units, preferably propylene oxide units, may also be present in the monohydric polyether alcohols.

The monohydric polyether alcohols are produced in known manner by the alkoxylation of monohydric alcohols, which preferably contain up to 6 carbon atoms. Preferred starter molecules are $C_{1-4}$ alkanols such as n-butanol, n-propanol, isopropanol, ethanol and preferably methanol in the context of the invention, "terminal polyether chains" are understood to be polyether chains which have been incorporated into the polyisocyanate compositions according to the invention through the use of component B).

The polyisocyanate compositions according to the invention are preferably produced by a two-step process. The urethane-modified polyisocyanate component A) to be used in the process according to the invention is first prepared in known manner (cf. for example DE-PS 1,090,196 or U.S. Pat. No. 3,183,112) from diisocyanate component A1) and polyhydric alcohol component A2). For example, starting components A1) and A2) may be reacted at 40° to 140° C., preferably at 50° to 110° C. in a urethane-forming reaction at an NCO:OH equivalent ratio of 4:1 to 20:1, preferably 5:1 to 10:1. The excess starting diisocyanate A1) may then be removed by distillation, preferably in a thin-layer evaporator, to a residual content of at most 0.5% by weight.

In the preparation of component A), the type of components A1 ) and A2) used and the quantities in which they are used are preferably selected so that urethane-modified polyisocyanate component A) has a urethane group content (expressed as $CHNO_2$, molecular weight 59) of 17 to 29% by weight, an (average) NCO functionality of 2.7 to 4.1, an NCO content of 12 to 20% by weight and a content of ether oxygen atoms incorporated through polyhydric ether alcohols A2) of 0 to 16% by weight, preferably 2 to 16% by weight and more preferably 2 to 12% by weight.

The urethane-modified polyisocyanates A) which generally accumulate in resin-like form are preferably dissolved in suitable organic solvents for further processing. Suitable solvents include the known lacquer solvents such as ethyl acetate, butyl acetate, ethylene glycol monomethyl or monoethyl ether acetate, 1-methoxypropyl-2-acetate, 2butanone, cyclohexanone, toluene, xylene and mixtures thereof. However, it is also possible in principle to use solvents such as propylene glycol diacetate, diethylene glycol dimethyl ether, diethylene glycol ethyl and butyl ether acetate, N-methyl pyrrolidone, N-methyl caprolactam and mixtures of these and/or the previously disclosed solvents.

The quantity of solvent in the resulting solutions of the urethane-modified polyisocyanates A) is preferably at most 40% by weight, more preferably at most 30% by weight and most preferably at most 25% by weight, based on the total weight of the solution.

In the second synthesis step, the dissolved polyisocyanates A) are reacted with polyether component B) at 20° to 100° C., preferably 40° to 80° C., in a urethane-forming reaction at an NCO:OH equivalent ratio of 4:1 to 120:1, preferably 6:1 to 100:1.

In a less preferred embodiment it is possible to prepare the polyisocyanate compositions according to the invention in a single synthesis step. In this embodiment polyalcohols A 1 ) and monohydric polyether alcohols B) are mixed and reacted with excess tolylene diisocyanate A1 ) at temperatures of 40° to 140° C., preferably 50° to 110° C. The quantities in which the reactants are used generally correspond to an NCO:OH equivalent ratio of 4:1 to 20:1, preferably 5:1 to 20:1.

After the prepolymerization, the excess unreacted tolylene diisocyanate is removed by thin-layer vacuum distillation to a residual content of at most 0.5% by weight. The resulting polyisocyanate mixtures are then dissolved in the previously described solvents. In this embodiment, the content of organic solvents should be at most 30 % by weight, preferably at most 25 % by weight and more preferably at most 20 % by weight, based on the total weight of the solution.

In all of the embodiments for the production of the polyisocyanate compositions according to the invention, the type of starting components used and the quantities in which they are used are selected within the limits of the present disclosure so that the polyisocyanate compositions according to the invention a) have an average NCO functionality, which may be calculated from the NCO content and the number average molecular weight (as determined by vapor pressure osmometry), of 1.9 to 3.3, preferably 2.6 to 3.0, b) a content of isocyanate groups (expressed as NCO, molecular weight 42) of 8 to 18% by weight, c) a content of ethylene oxide units (expressed as $C_2H_4O$, molecular weight 44) of 5 to 40%, preferably 10 to 30% by weight and more preferably 14 to 27% by weight, which are arranged in terminal polyether chains and contain an average of 7 to 25 alkylene oxide units in which at least 70 mol-%, preferably at least 80 mol-% and more preferably 100 mol-%, of the alkylene oxide units are ethylene oxide units, d) a content of urethane groups (expressed as CHNO2, molecular weight 59) of 13 to 33% by weight, preferably 16 to 25% by weight and e) a content of ether oxygen atoms incorporated through polyhydric ether alcohols of 0 to 16% by weight, preferably 2 to 16% by weight and more preferably 2 to 12% by weight, wherein the ranges set forth in a) - e) are based on solvent-free solids.

The polyisocyanate compositions are preferably used according to the invention in the form of solutions in the previously mentioned solvents. The solutions may readily be emulsified in water without having to apply intensive shear forces. Stable emulsions are formed in which the NCO/ water reaction takes place surprisingly slowly. The emulsions also surprisingly show no precipitation or sediment, even after standing for 24 hours at room temperature.

The two-component polyurethane coating compositions according to the invention contain the polyisocyanate compositions as cross-linking agents, i.e., as a crucial binder component. The second binder component in the coating compositions has an (average) hydroxyl functionality of at least 2 and contains at least one water-soluble or water-dispersible hydroxyl compound, preferably a polyhydroxyl compound having a number average molecular weight (which may be determined by gel permeation chromatography using polystyrene as the standard) of 500 to 50,000 and a hydroxyl value of 15 to 300.

Water dispersible or water soluble hydroxy-functional polyurethanes, polyether polyols or polyacrylate resins may be used as the second binder component. Hydroxy-functional urethane- and ester-containing polyols having the required molecular weights and hydroxyl values are also suitable.

The use of hydroxy-functional vinyl polymers, which are dissolved or dispersed in water, is preferred. These vinyl polymer polyols contain sulfonate and/or carboxylate groups, preferably carboxylate groups and optionally sulfonic acid and/or carboxyl groups, preferably carboxyl groups. They have a number average molecular weight (which may be calculated as described above) of 50 to 50,000, a hydroxyl value of 16.5 to 264 mg KOH/g and an acid value, based on all of the carboxyl and/or sulfonic acid groups, of 4 to 156 mg KOH/g solid resin. 10 to 100% of the carboxyl and sulfonic acid groups are present in the form of salt groups.

The hydroxy-functional polymers are produced by the known radical polymerization, for example, solution polymerization, emulsion polymerization or suspension polymerization. Solution and emulsion polymerization are preferred.

In the two-component polyurethane coating compositions according to the invention, the binder components, i.e. the polyisocyanate compositions according to the invention and the hydroxy-functional compounds, are present in quantities which correspond to an NCO:OH equivalent ratio of 0.6:1 to 2:1, preferably 0.8:1 to 1.5:1.

The water content of the coating compositions is generally 35 to 80% by weight, preferably of 40 to 70% by weight. The content of organic solvents is generally of 4 to 10% by weight.

In addition to the binders, water and solvents mentioned, the coating compositions according to the invention may also contain other known additives such as nonfunctional water-based lacquer binders (for producing special properties, for example, as additives for improving adhesion), flow control agents, pigments, fillers, matting agents, thickeners, antifoam agents and external emulsifiers.

The coating compositions according to the invention dry surprisingly quickly at temperatures as low as room temperature, so that they are particularly suitable for use in the wood and furniture industry. In view of the short cycle times required for industrial application, early sandability is desirable for this application.

The discovery that two-component coating compositions containing the polyisocyanate mixtures according to the invention dry even more quickly than the known solvent-containing two-component polyurethane coating compositions is completely unexpected. This is demonstrated in the following examples.

The water-based two-component polyurethane coating compositions according to the invention may also be dried at elevated temperature or by stoving at temperatures of up to 200° C.

The coating compositions according to the invention are particularly suitable for coating water-resistant substrates, in particular sheet-form substrates. Examples include sheet-form materials prepared from wood, chipboard, metal, glass, stone, ceramic materials, concrete, plastics, textiles, leather or paper. These substrates may be coated with known primers before coating with the coating compositions according to the invention.

The coatings produced from the coating compositions according to the invention are distinguished not only by their quick drying at ambient temperature, but also by their excellent optical properties, such as surface gloss, levelling and transparency.

The invention is illustrated by the following examples in which all parts and percentages are by weight, unless otherwise indicated.

EXAMPLES

Example 1

Production of a Polyisocyanate Composition According to the Invention

Example 1.1

Preparation of a Polyisocyanate A Containing Urethane Groups 440 g of a polyether (average molecular weight 440, prepared by the propoxylation of trimethylol propane) were slowly added dropwise at 60° C. to 3,654 g of a mixture of 80% 2,4-diisocyanatotoluene and 20% 2,6-diisocyanatotoluene. After the dropwise addition, the mixture was stirred for 2 hours at 60° C. The product was then freed from the monomeric diisocyanate by thin-layer vacuum distillation at 140° C./0.1 mm.

A polyisocyanate A containing urethane groups was obtained in the form of an almost colorless resin which was dissolved in butyl acetate to form an 80% solution. The solution of the polyisocyanate had the following characteristic data:

| | |
|---|---|
| Solids content: | 80% |
| Viscosity: | 4,800 mPa · s/23° C. |
| NCO content*: | 13.1% |
| Molecular weight*: | 1,150 g/mol (determined by vapor pressure osmometry) |
| Calc. NCO functionality*: | 3.59 |
| Monomer content*: | 0.03% by weight |

*Based on solids

Example 1.2

Process According to the Invention 16.5 g of butyl acetate and 66 g of a methanol-started monofunctional polyethylene oxide polyether, average molecular weight 550, were successively added dropwise at 40° C. to 400 g of the polyisocyanate A solution. The mixture was stirred at 40° C. until a constant NCO content of 7.5% was reached.

The resulting solution of the polyisocyanate composition according to the invention had the following characteristic data:

| | |
|---|---|
| Solids content: | 80% |
| NCO content*: | 9.4% |
| Viscosity: | 3,900 mPa · s/23° C. |
| Monomer content*: | <0.03% |
| Molecular weight*: | 1,232 g/mol (determined by vapor pressure osmometry) |
| Calc. NCO functionality*: | 2.57 |
| Urethane group content*: | 17% |
| Ethylene oxide units incorporated in terminal polyether chains*: | 16.1% |
| Ether oxygen atoms e, (in the chain)*: | 8.2% |

*Based on solids

Example 2

Production of a Polyisocyanate Composition According to the Invention

Example 2.1

Preparation of a Polyisocyanate A Containing Urethane Groups

A mixture of 252 g of trimethylol propane and 120 g of diethylene glycol was slowly added dropwise at 80° C. to 3,864 g of a mixture of 65% 2,4-diisocyanatotoluene and 35% 2,6-diisocyanatotoluene. After stirring for 2 hours at 80° C., the reaction mixture was worked up as in Example 1. The pale yellow resin obtained had the following characteristic data in the form of a 67% solution in butyl acetate:

| | |
|---|---|
| Solids content: | 67% |
| Viscosity: | 1,400 mPa · s/23° C. |
| NCO content*: | 17.3% |
| Molecular weight*: | 787 g/mol (determined by vapor pressure osmometry) |
| Calc. NCO functionality*: | 3.25 |
| Monomer content*: | 0.23% by weight |

*Based on solids

Example 2.2

Process According to the Invention 80 g of a methanol-started monofunctional polyethylene oxide polyether, average molecular weight 550, were added dropwise at 50° C. to 362 g of the dissolved polyisocyanate A. The mixture was stirred at 50° C. until a constant NCO content of 8.2% was reached.

The resulting solution of the polyisocyanate composition according to the invention had the following characteristic data:

| | |
|---|---|
| Solids content: | 73% |
| NCO content*: | 11.2% |
| Viscosity: | 3,200 mPa · s/23° C. |
| Monomer content*: | 0.1% |
| Molecular weight*: | 874 g/mol |
| Calc. NCO functionality*: | 2.34 |
| Urethane group content*: | 25% |
| Ethylene oxide units incorporated in terminal polyether chains*: | 23.5% |
| Ether oxygen atoms e, (in the chain)*: | 2.0% |

*Based on solids

Example 3

Single-Step Production of a Polyisocyanate Composition According to the Invention 157 g of a polyether (average molecular weight 440, prepared by the propoxylation of trimethylol propane) were slowly added dropwise at 50° C. to 372.4 g of a mixture of 80% 2,4-diisocyanatotoluene and 20% 2,6-diisocyanatotoluene. 71 g of a methanol-started monofunctional polyethylene oxide polyether, average molecular weight 550, were then added dropwise at the same temperature and the mixture was stirred until an NCO content of about 21% was reached.

To remove monomeric diisocyanate, the product was subjected to thin-layer vacuum distillation at 150° C./0.1 mm.

An almost colorless resin was obtained which, in the form of an 80% solution in butyl acetate, had the following characteristic data:

| | |
|---|---|
| Solids content: | 80% |
| Viscosity: | 900 mPa · s/23° C. |
| NCO content*: | 11.1% |
| Monomer content*: | 0.03% |
| Molecular weight*: | 1,150 g/mol (determined by vapor pressure osmometry) |
| Calc. NCO functionality*: | 3.05 |
| Urethane group content*: | 16.2% |
| Ethylene oxide units incorporated in terminal polyether chains*: | 15.4% |
| Ether oxygen atoms e, (in the chain)*: | 7% |

*Based on solids

Example 4

Preparation of an Aqueous Dispersion of a Polyacrylate Resin 10,000 g of n-butyl acetate were introduced into a 127 liter autoclave. The autoclave was then purged with nitrogen and closed. The contents of the autoclave were then heated with stirring to 110° C. A monomer mixture containing of 17,488 g of 2-hydroxyethyl methacrylate, 9,944 g of methyl methacrylate, 22,860 g of n-butyl acrylate and 4,572 g of acrylic acid and a solution of 1,905 g of azoisobutyronitrile in 29,718 g of n-butyl acetate were then simultaneously and uniformly added over a period of 4 hours. After the addition, the reaction was reactivated by the addition of a solution of 381 g of t-butyl per-2-ethylhexanoate in 762 g of n-butyl acetate. The reaction mixture was stirred for 4 hours, after which the polymer solution was combined with a mixture of 2,591 g of 25% aqueous ammonia solution and 112 g of deionized water. n-Butyl acetate was then distilled off together with water and residual monomers under a vacuum of 200 to 400 mbar and at a temperature of 50° to 70° C. Water was then added in a quantity such that a very fine, 30% dispersion was obtained.

| Characteristic data: | |
| --- | --- |
| Solids content: | 30% |
| Viscosity: | Approx. 10,000 mPa · s/23° C. |
| OH content*: | 4.0% |

*Based on solids

Example 5

Production of an Aqueous Two-Component Polyurethane Coating Composition According to the Invention 76.7 pads by weight of the aqueous dispersion described in Example 4, 0.83 pads by weight of a commercial thickener (Acrysol RM8, a product of Rohm & Haas) and 0.5 pads by weight of a commercial foam inhibitor (BYK 023, a product of BYK Chemie, Wesel) were carefully mixed with addition of 16.3 pads by weight of water. The resulting stock component for a water-dilutable two-component coating composition had substantially indefinite stability in storage. After addition of 23.8 parts by weight of the solution of the polyisocyanate composition from Example 3 and 20 pads by weight of water for dilution to the processing consistency, a processable water-dilutable two-component polyurethane coating composition was obtained.

The coating composition had a pot life of approximately 3 hours at room temperature. When the coating composition was applied to a glass plate in a wet film thickness of 200 μm, a transparent glossy film was obtained after drying; dry film thickness 40 μm. The film was touch-dry after drying 90 minutes at room temperature; after 2 hours, the film was ready for sanding.

Example 6

Production of an Aqueous Two-Component Polyurethane Coating Composition According to the Invention The stock component was prepared using the amounts and components described in Example 5. After addition of 30.5 parts by weight of the solution of the polyisocyanate composition from Example 1, 5.86 parts by weight of zinc stearate solution (20% in water) and 31 parts by weight of distilled water, a processable, water-dilutable two-component polyurethane coating composition was obtained. The coating composition had a pot life of 90 minutes at room temperature. A film applied to a glass plate in a wet film thickness of 200 μm dried to form a transparent, glossy film having a dry film thickness of 40 μm. After drying for only 2 hours at room temperature, the film had a pendulum hardness (according to DIN 53157) of 95 seconds. The film was ready for sanding after drying for only 25 minutes at room temperature.

Example 7

Production of an Aqueous Two-Component Polyurethane Coating Composition According to the Invention The stock component was prepared using the amounts and components described in Example 5. After addition of 25.9 parts by weight of the solution of the polyisocyanate composition from Example 2, 5.86 parts by weight of zinc stearate solution (20% in water) and 26 parts by weight of water, a processable water-dilutable two-component polyurethane coating composition was obtained. A film applied to a glass plate in a wet film thickness of 200 μm dried to form a transparent glossy film having a dry film thickness of 35 μm. After drying for only 2 hours at room temperature, the film had a pendulum hardness (according to DIN 53157) of 65 seconds. After drying for 25 minutes at room temperature, the film was ready for sanding.

Example 8

(Comparison Example) Production of a Solvent-Containing Two-Component Polyurethane Coating Composition 66.7 parts by weight of a commercial polyacrylate resin having a hydroxyl group content of 1.0% (Desmophen A 450, a product of Bayer AG), 47.73 parts by weight of n-butyl acetate, 1.13 parts by weight of zinc stearate and 12.7 parts by weight of a commercial urethane-modified polyisocyanate based on tolylene diisocyanate (Desmodur L 75, a product of Bayer AG, 75% solution in ethyl acetate, NCO content 13.0%) were thoroughly mixed.

A film applied to a glass plate in a wet film thickness of 200 μm dried to form a transparent high-gloss film. After drying for 6 hours at room temperature, the film had a pendulum hardness (as measured in accordance with DIN 53157) of 20 seconds. After 24 hours, the pendulum hardness rose to 124 seconds. The film was only ready for sanding after drying for 6 hours at room temperature.

Example 9

(Comparison Example) Production of a Solvent-Containing Two-Component Polyurethane Coating Composition 60 parts by weight of a commercial polyester polyol (Desmophen 1300, a product of Bayer AG, 75% solution in xylene) having a hydroxyl group content of 3% and 36.5 parts by weight of the polyisocyanate of Example 8 were thoroughly mixed with 1.9 pads by weight of zinc stearate and 30 parts by weight of n-butyl acetate. A film knife-coated onto a glass plate in a wet film thickness of 200 μm dried to form a transparent glossy lacquer film. After drying for 6 hours at room temperature, the film had a pendulum hardness (as measured in accordance with DIN 53157) of 25 seconds. The film was only ready for sanding after drying for 6 hours at room temperature.

Example 10

Production of an Aqueous Dispersion of a Polyacrylate Resin 400 g of methoxypropyl acetate were introduced into a 3-liter stirred autoclave equipped with a nitrogen inlet and outlet. The autoclave was then intensively purged with nitrogen, after which its contents were heated with stirring to 145° C. A mixture of 508 g of hydroxypropyl methacrylate (isomer mixture obtained by addition of 1 mole of propylene oxide onto I mol of methacrylic acid), 160 g of acrylic acid, 1000 g of methyl methacrylate and 252 g of n-butyl acrylate and an initiator solution containing 67 g of dibutyl peroxide in 100 g of methoxypropyl acetate were simultaneously and uniformly added over a period of 4 hours. The autoclave was then cooled to an internal temperature of 140° C. and the reaction was reactivated by addition of 13 g of dibutyl peroxide. The organically dissolved polymer was then combined with an aqueous neutralization solution of 90.7 g of a 25% ammonia solution in 3,000 ml of water in a 6 liter stirred flask. The aqueous/organic dispersion was homogeneously stirred and then distilled under a pressure of 100 to 300 mbar to remove the methoxypropyl acetate solvent and residual monomers.

A substantially transparent dispersion having the following characteristic data was obtained:

| | |
|---|---|
| Solids content: | 53.2% by weight |
| Viscosity: | 3,000 mPa · s/23° C. |
| OH content*: | 3.0% |

*Based on solids

Example 11

Production of an Aqueous Two-Component Polyurethane Coating Composition According to the Invention 100 pads by weight of the aqueous dispersion of the hydroxyfunctional polyacrylate resin of Example 10 were mixed with 0.7 pad by weight of a 25% aqueous solution of a commercial emulsifier (Emulgator WN, a product of Bayer AG) and 2.6 pads by weight of a 20% solution of a commercial polyurethane thickener (Acrysol RM8, a product of Rohm & Haas) in water. The resulting stock component for a water-dilutable two-component polyurethane coating composition possessed substantially indefinite stability in storage.

After the addition of 70.0 pads by weight of the solution of the polyisocyanate composition from Example 1 and 40 pads by weight of water, a processable aqueous two-component polyurethane coating composition was obtained. The coating composition had a pot life of approximately 5 hours at room temperature. After application of the coating composition to a substrate in a wet film thickness of 200 μm, corresponding to a dry film thickness of 50 to 60 μm, a transparent glossy film was obtained.

The film was dust-dry after 30 minutes and completely dry after 180 minutes. It had a pendulum hardness (as measured in accordance with DIN 53157) of 170 seconds. The films possessed good adhesion to parquet blocks, metals, mineral substrates (such as concrete, plaster and fiber cement) and to various plastics.

Example 12

Production of a Pigmented Aqueous Two-Component Polyurethane Coating Composition According to the Invention 7.56 parts by weight of water were homogeneously stirred with 0.64 part by weight of a commercial dispersion additive (BYK 154, a product of BYK, Wesel) and 0.22 part by weight of a commercial foam inhibitor (Bevaloid 581, a product of Erbslöh, Düsseldorf). 25.07 parts by weight of a commercial titanium dioxide, rutile type (Bayertitan R-KB-4, a product of Bayer AG), were then added in portions with gentle stirring. The dispersion rate was then increased with a dispersion disk to approximately 10 to 15 revolutions per second and then left at that level for 30 minutes. The resulting slurry was sieved and cooled.

The slurry was then mixed with 42.02 parts by weight of the dispersion of the hydroxy-functional acrylate resin of Example 10, 1.19 parts by weight of a 10% aqueous solution of a commercial biocide for preventing fungal contamination (Preventol D6, a product of Bayer AG) and 1.19 pads by weight of a 5% aqueous solution of a commercial polyurethane thickener (Acrysol RM8, a product of Rohm & Haas). The stock component of an aqueous pigmented two-component polyurethane coating composition with substantially indefinite stability in storage was obtained.

22.11 pads by weight of the solution of the polyisocyanate composition from Example 1 were added to 77.89 parts by weight of the stock component. A processable two-component coating composition was obtained after careful stirring. The mixture had a pot life of 4 hours at room temperature. A film applied to a substrate in a wet film thickness of 200 μm, corresponding to a dry film thickness of 50 to 60 μm, was dust-dry after 20 minutes and completely dry after 120 minutes. The dry film had a pendulum hardness (according to DIN 53157) of 130 seconds. The film possessed good solvent resistance and good adhesion to wood and mineral substrates.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water-dispersible or water-soluble polyisocyanate composition obtained by the partial urethanization of the isocyanate groups of 2,4- and/or 2,6-diisocyanatotoluene by reaction with monohydric and polyhydric alcohols, wherein the polyisocyanate composition has, based on solids, a) an average NCO functionality of 1.9 to 3.3, b) a content of isocyanate groups (expressed as NCO, molecular weight 42) of 8 to 18% by weight, c) a content of ethylene oxide units (expressed as $C_2H_4O$, molecular weight 44) of 5 to 40% by weight which are arranged in terminal polyether chains containing an average of 7 to 25 alkylene oxide units in which at least 70 mol-% of the alkylene oxide units are ethylene oxide units, and d) a urethane group content (expressed as $CHNO_2$, molecular weight 59) of 13 to 33% by weight.

2. The water-dispersible polyisocyanate composition of claim 1 which additionally has e) a content of ether oxygen atoms incorporated through polyhydric ether alcohols of 2 to 16% by weight.

3. A process for the production of a polyisocyanate composition which has a) an average NCO functionality of 1.9 to 3.3, b) a content of isocyanate groups (expressed as NCO, molecular weight 42) of 8 to 18% by weight, c) a content of ethylene oxide units (expressed as $C_2H_4O$, molecular weight 44) of 5 to 40% by weight which are arranged in terminal polyether chains containing an average of 7 to 25 alkylene oxide units in which at least 70 mol-% of the alkylene oxide units are ethylene oxide units, and d) a urethane group content (expressed as $CHNO_2$, molecular weight 59) of 13 to 33% by weight, which comprises reacting at an NCO:OH equivalent ratio of 4:1 to 120:1

A) a polyisocyanate component having an average NCO functionality of 2.7 to 4.1, a content of isocyanate groups of 12 to 20% by weight and a content of urethane groups of 17 to 29% by weight, and containing at least one urethane-modified polyisocyanate produced by partial urethanization of the isocyanate groups of 2,4-and/or 2,6-diisocyanatotoluene with B) a monofunctional hydrophilic polyether component containing at least one monohydric polyether alcohol containing an average of 7 to 25 alkylene oxide units in which at least 70 mol-% of the alkylene oxide units are ethylene oxide units, to form additional urethane groups.

4. The process of claim 3 wherein polyisocyanate component

A) contains 2 to 16% by weight of ether oxygen atoms incorporated by the reaction of 2,4- and/or 2,6-diisocyanatotoluene with a polyhydric alcohol containing ether groups.

5. The process of claim 3 wherein said monohydric polyether alcohol is prepared by the alkoxylation of a $C_{1-4}$ alkanol.

6. The process of claim 4 wherein said monohydric polyether alcohol is prepared by the alkoxylation of a $C_{1-4}$ alkanol.

7. An aqueous two-component coating composition wherein the binder contains, in quantities which correspond to an NCO:OH equivalent ratio of 0.6:1 to 2:1, I) a water-dispersible or water-soluble polyisocyanate composition obtained by the partial urethanization of the isocyanate groups of 2,4- and/or 2,6-diisocyanatotoluene by reaction with monohydric and polyhydric alcohols, wherein the polyisocyanate composition has, based on solids, a) an average NCO functionality of 1.9 to 3.3,
b) a content of isocyanate groups (expressed as NCO, molecular weight 42) of 8 to 18% by weight,
c) a content of ethylene oxide units (expressed as $C_2H_4O$, molecular weight 44) of 5 to 40% by weight which are arranged in terminal polyether chains containing an average of 7 to 25 alkylene oxide units in which at least 70 mol-% of the alkylene oxide units are ethylene oxide units, and
d) a urethane group content (expressed as $CHNO_2$, molecular weight 59) of 13 to 33% by weight, and II) a water-soluble or water-dispersible polyhydroxyl component.

8. The coating composition of claim 7 wherein component II) consists essentially of at least one water-soluble or water-dispersible hydroxy-functional polyacrylate resin having a number average molecular weight of 500 to 50,000.

9. A coated water-resistant, sheet-form substrate which is coated with the coating composition of claim 7.

10. The coating composition of claim 7 wherein the water-dispersible or water-soluble polyisocyanate composition additionally has e) a content of ether oxygen atoms incorporated through polyhydric ether alcohols of 2 to 16% by weight.

11. The coating composition of claim 8 wherein the water-dispersible or water-soluble polyisocyanate composition additionally has e) a content of ether oxygen atoms incorporated through polyhydric ether alcohols of 2 to 16% by weight.

* * * * *